May 8, 1951 A. KAMP 2,552,179
VARIABLE SPEED SEGMENT PULLEY
Filed Aug. 26, 1948 7 Sheets-Sheet 4
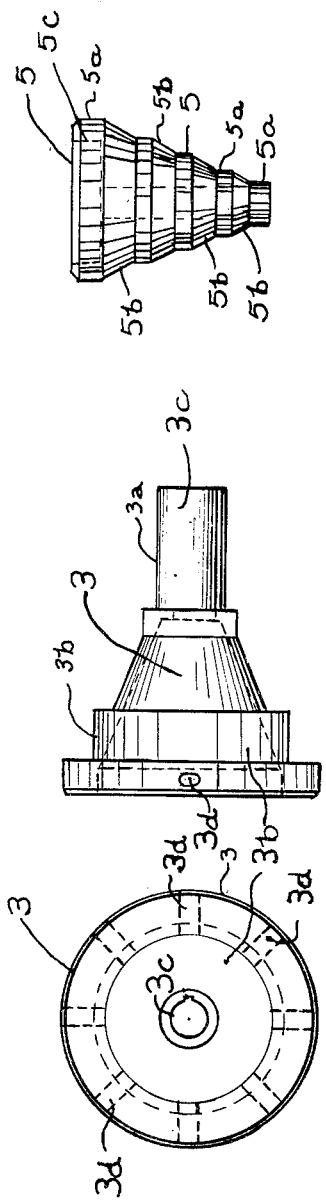

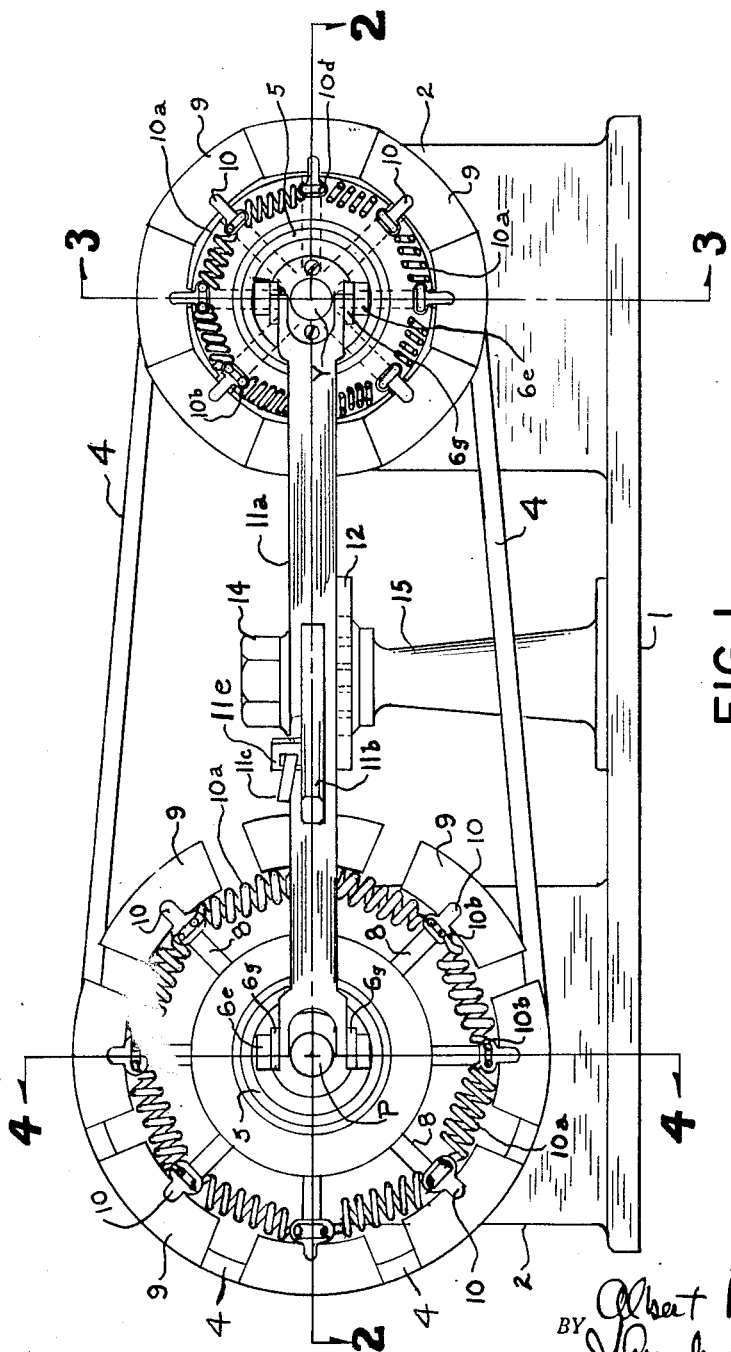

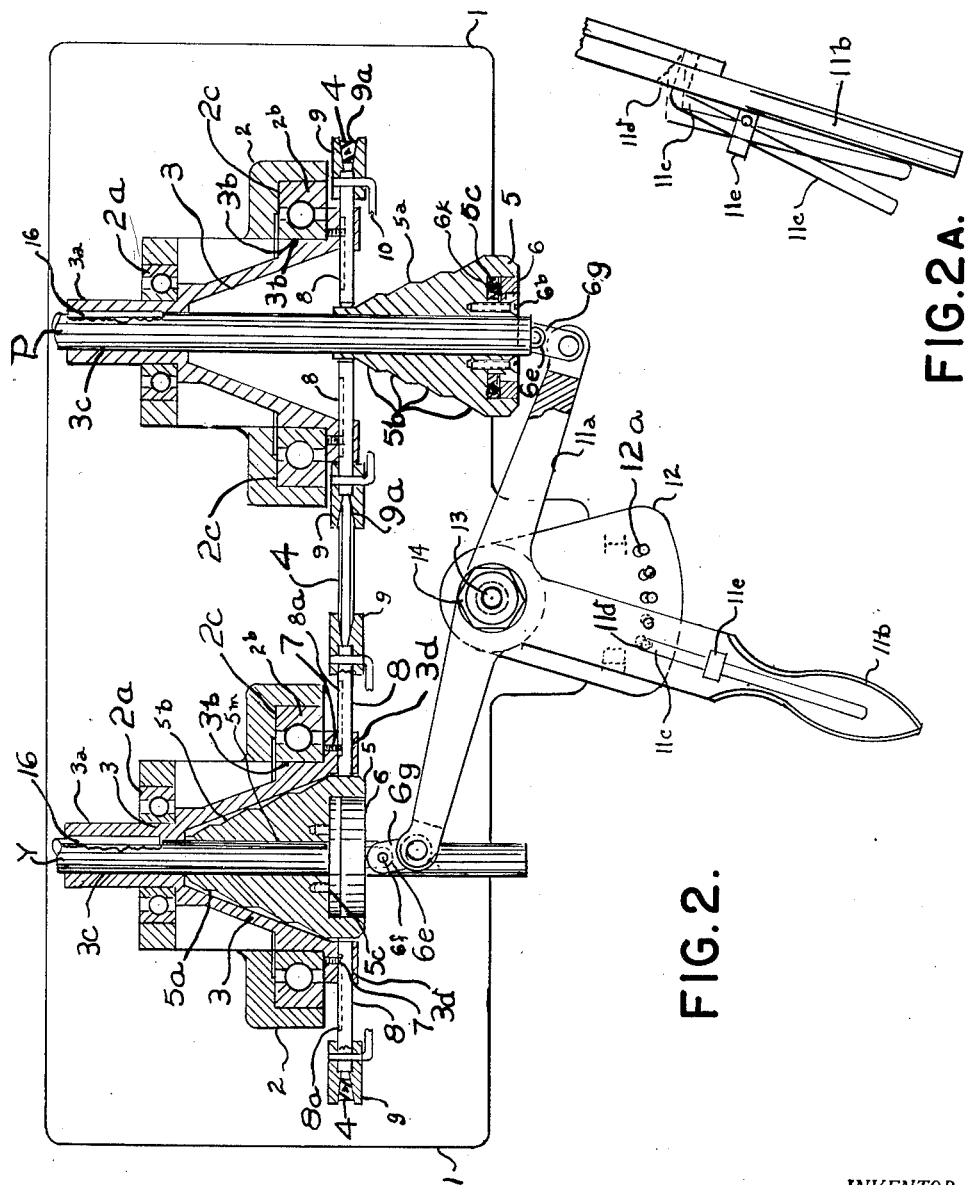

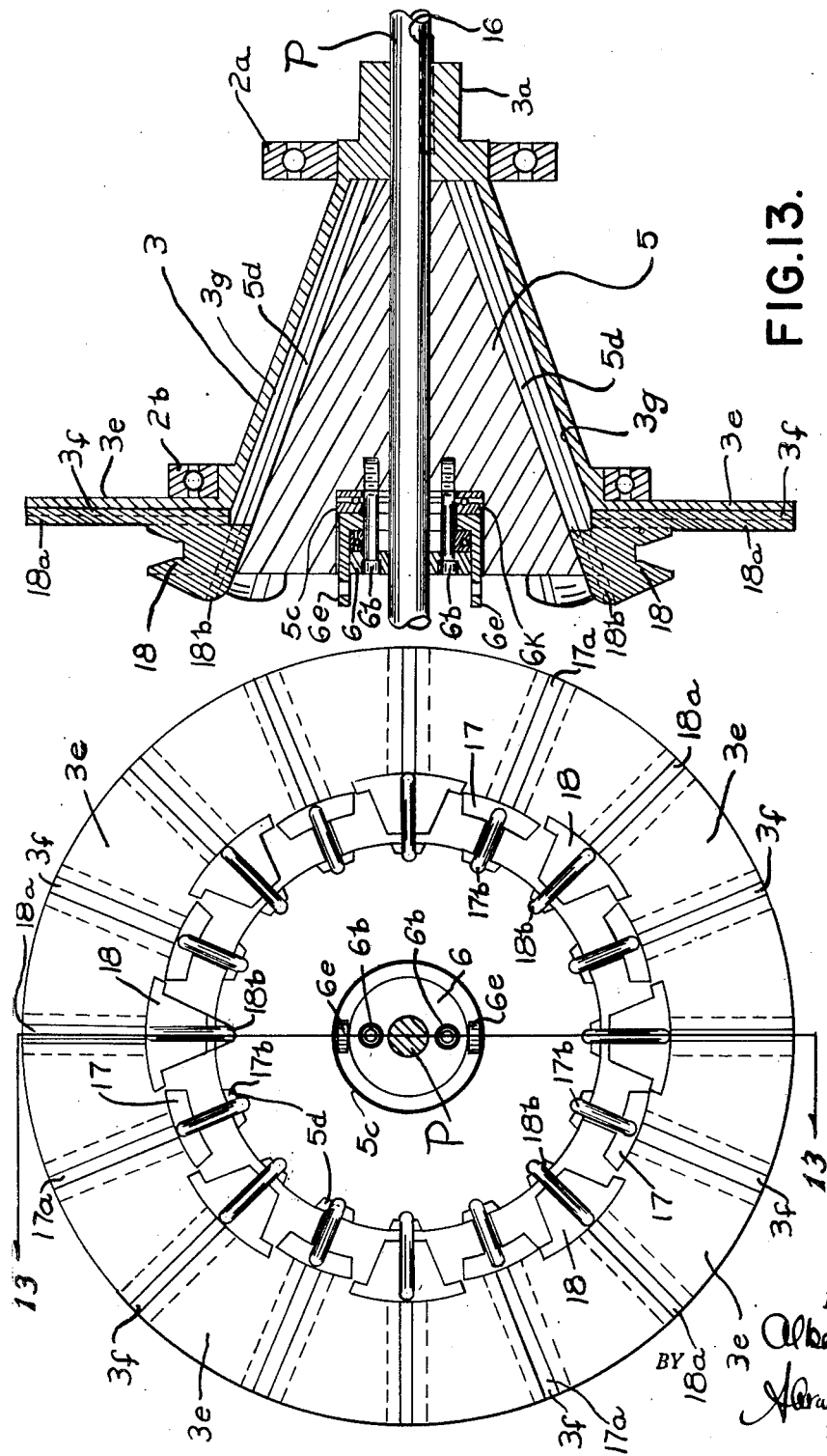

May 8, 1951 A. KAMP 2,552,179
VARIABLE SPEED SEGMENT PULLEY
Filed Aug. 26, 1948 7 Sheets-Sheet 6
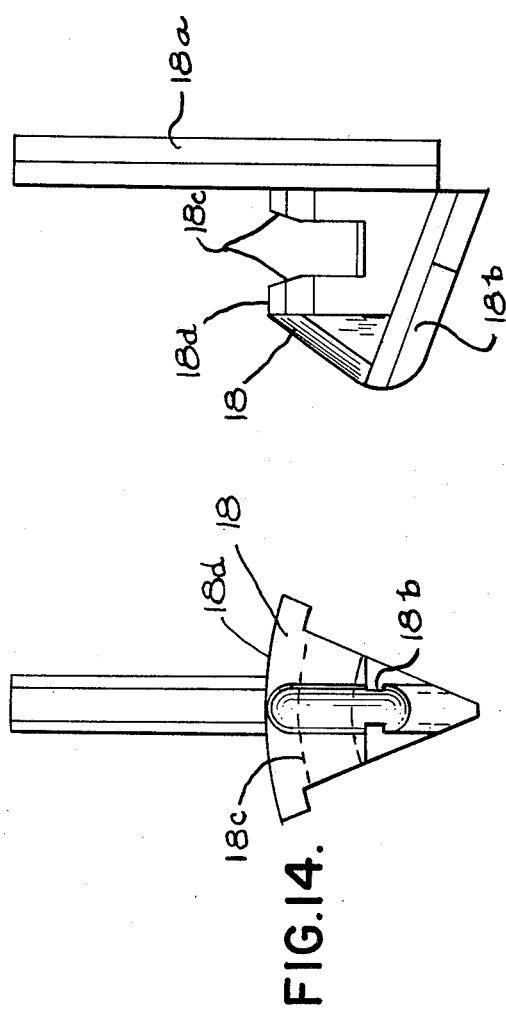
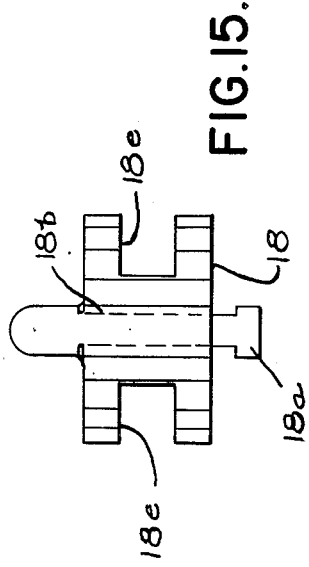

May 8, 1951 A. KAMP 2,552,179
VARIABLE SPEED SEGMENT PULLEY
Filed Aug. 26, 1948 7 Sheets-Sheet 7
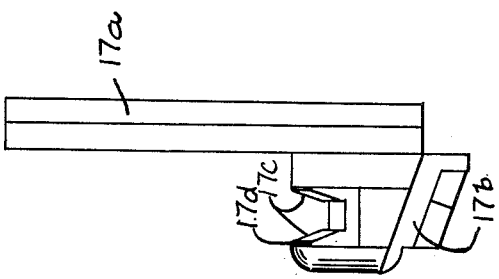
FIG.20.
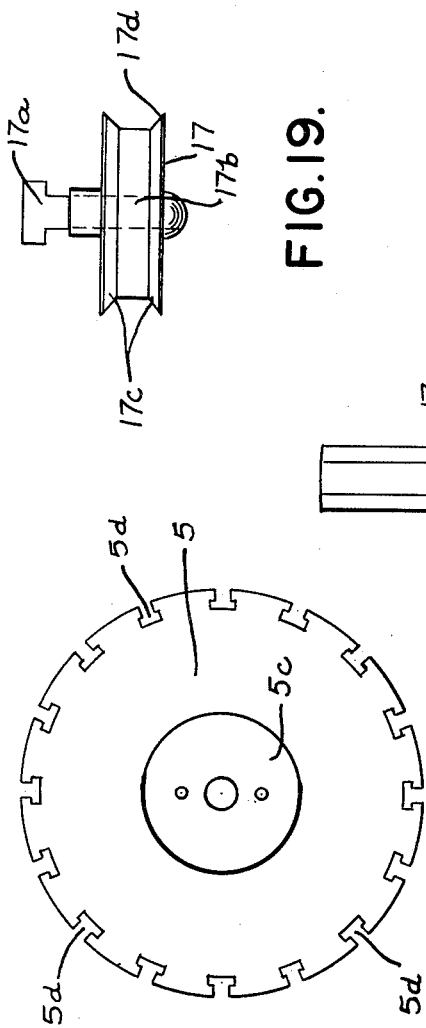
FIG.19.
FIG.18.
FIG.17.
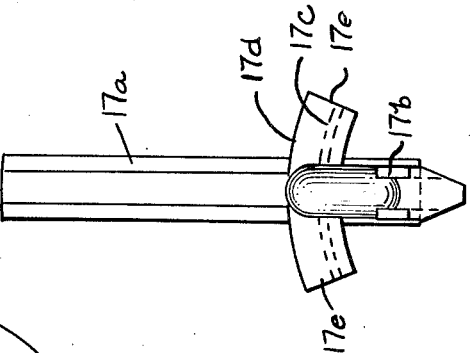
INVENTOR.
Albert Kamp
BY
ATTORNEYS Patented May 8, 1951

2,552,179

UNITED STATES PATENT OFFICE 2,552,179

VARIABLE SPEED SEGMENT PULLEY

Albert Kamp, Elmira, N. Y.

Application August 26, 1948, Serial No. 46,200

9 Claims. (Cl. 74—230.21)

This invention is a novel variable speed segment pulley for the purpose of increasing and decreasing speeds between a driving shaft and a driven shaft, the same being more efficient, utilizing less effort and time, and using a larger selection of speeds and feeds than heretofore obtained, the present application being an improvement upon my prior U. S. Letters Patent No. 1,230,718 dated June 19, 1917.

The primary object of my present invention is to provide a unit that may be applied to machines which require variable speeds, the same having a selectivity that will give more speeds and feeds per unit, or a finer variable speed selection.

Another object of my invention is to provide a unit which will occupy less space, and therefore be more compact, than variable speed units heretofore produced for the purpose of changing speeds and feeds.

Other minor objects of the invention will be hereinafter set forth.

I will explain the invention with reference to the accompanying drawings, which illustrate several practical embodiments thereof, to enable others familiar with the art to adopt and use the same; and will summarize in the claims the novel features of construction and novel combination of parts, for which protection is desired.

In said drawings:

Figure 1 is a front elevation of my novel variable speed segment pulley.

Fig. 2 is a horizontal section therethrough on the line 2—2, Fig. 1.

Fig. 2a is a side elevation of the handle, shown in Fig. 2.

Fig. 5 is an end view of one of the cone cylinders.

Fig. 6 is a side elevation of the cone cylinder shown in Fig. 5.

Fig. 7 is a plan view of one of the cones.

Figs. 8, 9 and 10 are vertical sectional, side elevational, and end elevation views, respectively, of one of the spokes of the cones used in the assembly.

Fig. 11 is an end view of the cone shown in Fig. 7.

Fig. 12 is an end view of a modified form of cone cylinder showing the cone inserted therein.

Fig. 13 is a longitudinal section on the line 13—13, Fig. 12.

Fig. 14 is a front elevation of the large diameter segments.

Fig. 15 is a bottom plan view of the segment shown in Fig. 14.

Fig. 16 is a side elevation of the segment shown in Fig. 14.

Fig. 17 is an end view of the modified cone having spaced T slots.

Fig. 18 is a front elevation of one of the smaller diameter segments.

Fig. 19 is a top plan view of the segment shown in Fig. 17.

Fig. 20 is the side elevation of the segment shown in Fig. 18.

Figure 4:
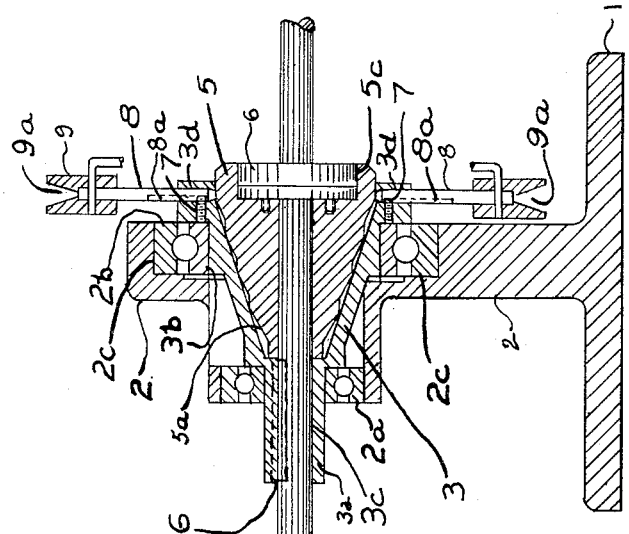
Fig. 4 is a vertical section on the line 4—4, Fig. 1.

As shown in Figs. 1 to 4, inclusive, my novel variable speed segment pulley comprises a base 1, on which is mounted at opposite ends uprights 2, the same carrying journals for a pair of parallel shafts P and Y, one of which, such as P, may be the power input shaft, and the other shaft Y the power takeoff shaft, although the power input and takeoff shafts may be reversed, if desired.

As shown, each of the uprights 2 is provided with ball bearings 2a adapted to journal the smaller ends 3a of cone-shaped members 3, and also carries in the counterbore 2c of the uprights 2 anti-friction bearings 2b in which the larger ends 3b of the cone-shaped members 3 are journaled, whereby the cone-shaped members 3 may be revolved in the uprights 2 with a minimum of friction. Preferably the smaller ends 3a of the cone-shaped members 3 are provided with bores 3c surrounding their respective shafts P and Y, the same being keyed thereto in any desired manner, such as by keys 16, of any desired type. The power input may be directly applied to either of the hubs 3a by a power input gear or belt (not shown).

Radially movably mounted at the larger ends 3b of the cone cylinders 3 are a series of radially disposed spokes 8, eight being shown in connection with each cone cylinder 3 in Fig. 1. The inner ends of the spokes 8 are adapted to directly contact cones 5, which are axially movably mounted upon the respective shafts P and Y, so as to positively control the effective diameters of the belt pulleys as hereinafter described.

Between the outer ends of adjacent spokes 8 are coiled springs 10a having their ends 10b fitted into eyes 10 formed adjacent the outer ends of the spokes, whereby the action of the springs 10a between adjacent spokes will tend to at all time maintain the inner ends of the spokes 8 in contact with their related cones 5. While I have shown eight spokes 8 arranged on each expanding pulley, obviously a greater or lesser number of spokes 8 with their related springs 10a may be used, the particular number of spokes and springs forming no part of my present invention.

At the outer end of each spoke 8 is a pulley segment 9 having in its outer periphery a V-shaped groove 9a for a V-belt or the like, the length of the segments 9 being such that when the spokes 8 are fully retracted the ends of the segments 9 will closely abut, as indicated in the right-hand end of Fig. 1 forming a continuous belt pulley, but when expanded their maximum extent, as shown in the left-hand end of Fig. 1, the segments 9 will be somewhat spaced apart.

The pulleys on the respective shafts P and Y are disposed in alignment and a belt 4, which preferably is a V-shaped belt to suit the grooves 9a of the segments 9, passes around the pulleys 9 to form a driving means between the shafts P and Y. Obviously, the grooves 9a in the pulleys 9 need not be V-shaped, but may be of any other desired shape to receive the correspondingly shaped belt 4. Thus, by expanding or contracting the respective belt pulleys formed by the segments 9, the ratios of drive between the shafts P and Y may be controlled.

Figure 3:
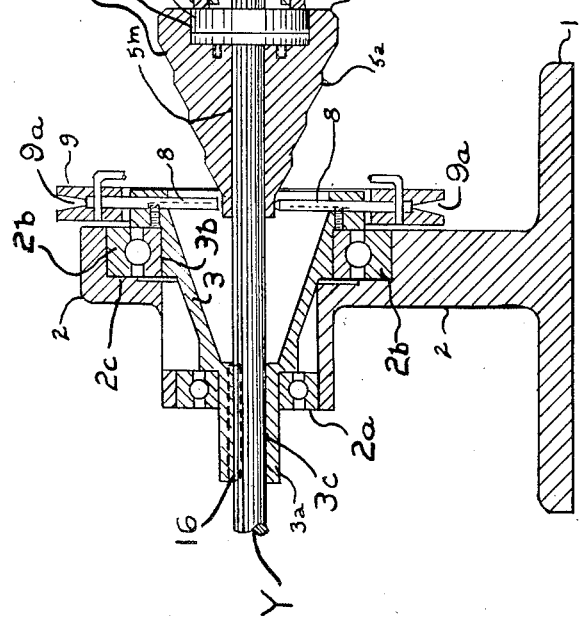
Fig. 3 is a vertical section on the line 3—3, Fig. 1.

The radial expansion and contraction of the spokes 8 of the respective pulleys is controlled by the cones 5 which are axially slidably mounted with respect to their respective shafts P and Y, the same being shown more particularly in Figs. 2 to 4 inclusive.

As shown, Figs. 7 and 11, each cone 5 has stepped annular surfaces 5a increasing progressively in diameter, the stepped surfaces having inclined cone faces 5b interposed therebetween, thus providing for each cone a series of peripheral surfaces parallel with the axes of their respective shafts P and Y progressively increasing from the smaller end to the larger end thereof. Each cone 5 has at its larger end a plate 6 secured in a recess 5c in the larger end of the related cone by means of screws 6b, an anti-friction bearing 6k being interposed between the inner face of the plate 6 and the base of the recess 5c. Each plate 6 carries on its outer face a pair of spaced lugs 6e above and below the related shaft P or Y, whereby the cones 5 may be forced into or pulled out of their respective cone cylinders 3. An operating lever 11a is journaled as at pivot 13 on a bracket 15 secured to the base 1 by a nut 14 intermediate the shafts P and Y, preferably halfway therebetween, said lever 11a having bifurcated ends which are pivotally connected by links 6g respectively to the upper and lower lugs 6e of the plates 6.

By the above construction, the arm 11a will, when swung to the right or left (Fig. 2), move through the parallel links 6g, their respective cones 5 simultaneously in or out, to bring the respective flat portions 5a of the cones 5 opposite the inner ends of the spokes 8, the spokes moving radially in their respective bores 3d, Figs. 5 and 6, in the member 3 and having longitudinal slots 8a for receiving screws 7 extending thereinto from the member 3 to guide the spokes 8. One cone 5 moves in with respect to the cone cylinder 3 while the other is moving out. Thus various speed ratios may be obtained by a mere setting of the lever 11a, which is controlled by a hand lever 11b operating over a plate 12 having a series of holes 12a therein corresponding with the number of flat portions 5a of the cones 5, a lock 11c on the lever 11b being provided to engage any of the series of holes 12a to hold the cone 5 in their adjusted positions.

As shown in Figs. 1, 2 and 2a, the lock 11c is preferably pivoted in an eye 11e and its inner end passes through an opening 11d in the hand lever 11b, and is of sufficient length to engage one of the series of holes 12a in the plate 12 to lock the hand lever 11b in adjusted position. When, however, the lock 11c is depressed, the inner end thereof will be disengaged from the hole of the series 12a so that the lever 11b may be swung to engage sme in one of the other holes 12a of the series.

Thus, as one driving pulley 9 is enlarged in diameter the other is correspondingly decreased, and the same belt 4 will drive the assembly at all speeds irrespective of the setting of the hand lever 11b.

A modified embodiment of my invention is illustrated in Figs. 12 through 20 wherein the general form of the mechanism is similar to that set forth above, similar reference characters designating similar parts. In this embodiment the cone cylinder 3 is journaled in bearings 2a and 2b, respectively, as in the previous form, and carries an annular flange 3e near its larger end, the flange 3e having a series of spaced radial T-shaped slots 3f in its outer face for the purpose hereinafter described.

The main bore 3g within the cone cylinder 3 is conical in shape to receive the cone 5 axially slidably journaled on the shaft P. The plate 6 is held in the recess 5c of the cone 5 as previously described and has outwardly extending opposed lugs 6e as hereinbefore described. Circumferentially spaced along the conical surface of the cone 5 are T-shaped slots 5d lying on the elements of the cone and spaced therearound with the same angular spacing as the slots 3f on the flange 3e, and being radially aligned therewith.

The spokes 8 and segments 9 of the former embodiment have been replaced in this form by members 17 and 18, members 17 being shown in Figs. 18 through 20, and the members 18 being shown in detail in Figs. 14 through 16. Both members 17 and 18 have T-shaped tongue slides 17a and 18a, respectively, adapted to lie in and engage the slots 3f in the flange 3e. Members 17 and 18 are alternately disposed around said flange. At the inner ends of the respective members 17 and 18 are T-shaped tongue slides 17b and 18b, inclined with respect to slides 17a and 18a, respectively, at the same angle as the angle of the conical surface of the cone 5, these inner slides 17b and 18b lying in and engaging the T-shaped slots 5d of the cone 5, so that as the cone 5 is moved axially into the cone cylinder 3 the members 17 and 18 move outwardly in the slots 3f, or are pulled radially inwardly when the cone 5 is moved outwardly from the cone cylinder 3.

The members 17 and 18 have V-shaped pulley grooves 17c and 18c, respectively, in the segmented portions 17d and 18d, respectively, for receiving and cooperating with the drive belt 4. At each end of the segments 18d a portion thereof is cut away as at 18e, the width of the cut out portion 18e being sufficient to receive the ends 17e of the segments 17d when the members 17 and 18 are moved inwardly to the fullest extent so that there is no interference between the alternate members 17 and 18. The pulley grooves 17c and 18c are so located on their respective members that the operating diameters presented by these grooves to the belt 4 during operation will be constant as the assembly rotates.

During operation of either embodiment the effective diameters of the pulley segments are changed by motion of the handle 11b which changes the axial location of the cones 5 within the cone cylinders 3; one cone always moving inwardly when the other is moved outwardly. In the first embodiment the radial position of the spokes 8 is set by choosing the annular flats 5a on which the inner ends of the spokes rest, the springs 10a serving to hold the inner ends of the spokes against the flats 5a. The diameters of these flats are so chosen as to keep the same tension on the belt 4 regardless of the ratio of pulley diameters selected. In the second embodiment the ratio of the diameter is continuously and smoothly variable over the full range of selection since the cones 5 are not divided into series of flats. The latter embodiment is more versatile and more rugged in construction and has the additional advantage of a greater number of nesting pulley segments to give smoother operation because the pulleys more nearly approximate a circle.

I do not limit my invention to the exact forms shown in the drawings, for obviously changes may be made therein within the scope of the claims.

I claim:

1. In a device of the character described, a pair of rotatable spaced parallel hollow cone members, series of segments respectively mounted on spokes radially movably mounted at the larger ends of the cone members with their inner ends extending within the cone members; axially movable cones adapted to be shifted in and out of the cone members against which the inner ends of the spokes abut; an endless member running around said segments, and means for simultaneously shifting the cones in opposite directions, said shifting means comprising axially disposed plates mounted in the outer ends of the respective cones, said plates having lugs; a pivoted lever having its ends connected by links to the said lugs; an operating handle on said lever extending radially of the pivot; a fixed plate below said handle having an arcuate series of holes therein; and a lock carried by the handle and normally engaging one of said holes to hold the cones in adjusted positions.

2. In a device as set forth in claim 1, said lock comprising a bar pivoted in an eye on said handle and having a flanged inner end passing through a hole in the handle and engaging a hole in the plate, said flanged end disengaging the hole in the plate when the outer end of the bar is depressed.

3. In a device of the character described, a pair of spaced parallel hollow rotatable cone-shaped members; a pair of shafts fixedly journaled within said cone-shaped members, one of said shafts being the driven shaft; series of spokes radially movably mounted at the larger ends of the cone-shaped members with their inner ends extending into the hollow of the cone-shaped members; axially movable cones on said shafts adapted to be shifted in and out of the hollow of the members against which cones the inner ends of the spokes abut; means for simultaneously shifting the cones in opposite directions; pulley segments carried by the respective spokes and adapted when the spokes are retracted their maximum amount to abut and form continuous pulleys; and endless member running around the pulleys, said pulley segments being carried at the inner ends of said spokes; said cones having longitudinally disposed undercut grooves in their peripheries registering with radial undercut guides for the spokes in the larger ends of the cone-shaped members; and said spokes having undercut slide-forming heads at their inner ends engaging the undercut grooves in the said cones to shift the spokes radially as the cones are moved axially of their shafts.

4. In a device as set forth in claim 3; the pulley segments of alternate spokes being recessed at their ends to receive the ends of the adjacent segments when the spokes are retracted their fullest extent, to permit contraction of the pulley segments.

5. In a device of the character described, a base; a pair of spaced parallel hollow cone-shaped members journaled on said base in anti-friction bearings; a pair of shafts journaled and keyed within said cone-shaped members, one of said shafts being a driven shaft; series of spokes radially movably mounted in radial undercut guides formed at the larger ends of the cone-shaped members with their inner ends extending into the hollow portions of the cone-shaped members; axially movable cones on said shafts adapted to be shifted in and out of the hollow portions of the members against which the inner ends of the spokes abut; means for simultaneously shifting the cones in opposite directions; belt pulley segments carried by the respective spokes and adapted when the spokes are retracted their maximum amount to abut and form continuous belt pulleys; and an endless belt running around the respective belt pulleys.

6. In a device of the character described, a base; a pair of spaced hollow cone members journaled on the base; a pair of shafts keyed within said cone members, one of the shafts being driven; series of pulley segments respectively mounted on spokes radially movably mounted at the larger ends of the cone members with their inner ends extending within the cone members; axially movable cones adapted to be shifted in and out of the cone members against which the inner ends of the spokes abut; an endless member running around said pulley segments; and means for simultaneously shifting the cones in opposite directions, said shifting means comprising axially disposed plates mounted in anti-friction bearings in the outer ends of the respective cones, said plates having lugs; a lever pivoted on said base and having its ends connected by links to the said lugs; an operating handle on said lever extending radially of the pivot; a plate mounted on the base below said handle and having an arcuate series of holes therein; and a lock carried by the handle and normally engaging one of said holes to hold the cones in adjusted positions.

7. In a device as set forth in claim 6, said lock comprising a bar pivoted in an eye on said handle and having a flanged inner end passing through a hole in the handle and engaging a hole in the plate, said flanged end disengaging the hole in the plate when the outer end of the bar is depressed.

8. In a device of the character described, a base; a pair of spaced parallel hollow cone-shaped members journaled on said base in anti-friction bearings; a pair of shafts journaled and keyed within said cone-shaped members, one of said shafts being a driven shaft; series of spokes radially movably mounted in radial undercut guides formed at the larger ends of the cone-shaped members with their inner ends extending into the hollow portions of the cone-shaped members; axially movable cones on said shafts adapted to be shifted in and out of the hollow portions of the members against which the inner ends of the spokes abut; means for simultaneously shifting the cones in opposite directions; belt pulley segments carried by the respective spokes and adapted when the spokes are retracted their maximum amount to abut and from continuous belt pulleys; an endless belt running around the respective belt pulleys, said belt pulley segments being carried at the inner ends of said spokes; said cones having longitudinally disposed undercut groves in their peripheries registering with the radial undercut guides in the larger ends of the cone-shaped members; and said spokes having undercut slide forming heads at their inner ends engaging the undercut grooves in the said cones to shift the spokes radially as the cones are moved axially of their shafts.

9. In a device as set forth in claim 8; the pulley segments of alternate spokes being recessed at their ends to receive the ends of the adjacent segments when the spokes are retracted their fullest extent, to permit contraction of the pulley segments.

ALBERT KAMP.

REFERENCES CITED

The following references are of record in the file of this patent:

UNITED STATES PATENTS

| Number | Name | Date |
| --- | --- | --- |
| 889,902 | Campbell et al. | June 9, 1908 |
| 1,132,125 | Severy | Mar. 16, 1915 |
| 1,230,718 | Kamp | June 19, 1917 |
| 1,379,504 | Young | May 24, 1921 |